United States Patent [19]

Lucas

[11] Patent Number: 5,293,984
[45] Date of Patent: Mar. 15, 1994

[54] DEVICE TO HANDLE AND TO ORIENT FLAT WORKPIECES ARRANGED IN BATCHES

[75] Inventor: Jean-Jacques Lucas, Prechac, France

[73] Assignee: Bobst SA, Switzerland

[21] Appl. No.: 989,718

[22] Filed: Dec. 14, 1992

[30] Foreign Application Priority Data

Dec. 13, 1991 [FR] France .................................. 91 15756

[51] Int. Cl.$^5$ ................................................ B65G 29/00
[52] U.S. Cl. ...................................... 198/414; 198/787
[58] Field of Search ............... 198/787, 782, 456, 436, 198/414, 468.01, 468.9, 750, 431; 193/35 MD, 35 SS

[56] References Cited

U.S. PATENT DOCUMENTS

| | | | |
|---|---|---|---|
| 495,683 | 4/1893 | Rigby | 198/414 |
| 4,068,753 | 1/1978 | Jarman | 193/35 MD |
| 4,456,116 | 6/1984 | Jarman | 198/414 |
| 4,541,768 | 9/1985 | Walker et al. | 198/414 X |
| 4,852,721 | 8/1989 | Stille | 198/782 |
| 5,000,305 | 3/1991 | Lucas | 198/414 |
| 5,147,032 | 9/1992 | Rombouts | 198/787 X |
| 5,160,017 | 11/1992 | Goodman et al. | 198/787 X |

FOREIGN PATENT DOCUMENTS 0257438 3/1988 European Pat. Off. .
1074779 2/1984 U.S.S.R. ........................ 198/414

*Primary Examiner*—Cheryl L. Gastineau
*Attorney, Agent, or Firm*—Hill, Steadman & Simpson

[57] ABSTRACT

A handling and orienting device comprises a carrier plane surface that includes a series of driven rollers between which a table equipped with driven balls is located, the carrier plane and table are relatively movable upward and downward, as well as shifted sidewise in one or the other direction. The driven balls are actuated by a rotating disk and the disk is able to rotate in one or the other direction.

9 Claims, 5 Drawing Sheets

DEVICE TO HANDLE AND TO ORIENT FLAT WORKPIECES ARRANGED IN BATCHES

BACKGROUND OF THE INVENTION

The present invention is directed to a device designed to handle and orient flat workpieces which are arranged in batches, and specifically to arrange flat workpieces consisting of box blanks or corrugated box blanks.

In the processing industry for box blanks or corrugated box blanks, it is frequently necessary to have to carry batches of the box blanks or of folded box blanks from one point of a production line to another; for example, to carry a batch of flat workpieces from one unit of the production machine to another. In order to effect this carrying operation, motorized conveyors, for example belts or rollers, are generally used. It may also be necessary to orient the batch to be carried so as to have the batch directed in a predetermined position toward an inlet of the next processing unit. To this aim, the use of swivelling or rotating tables equipped with carrier balls have been suggested.

U.S. Pat. No. 5,000,305, whose disclosure in incorporated herein by reference thereto and which claims priority from the same French Application as French Patent Reference 2,637,878, is related to such a rotating table. In this patent, the batches of flat workpieces are handled and oriented by means of a device having a carrier plane surface equipped with balls. A central disk is also provided with balls and is arranged within the carrier plane surface and is able to effect, upon request, a vertical movement which enables the charge of blanks supported by the disk to be rotated when the disk is in an upper position above the plane of the table. The charge, i.e., the batch of flat workpieces, will be angularly turned either by 90° or by 180° and then the central disk will come back to its lower position and the batch will then be carried in a linear way into the production line.

The balls of the carrier plane surface, as well as the balls of the central disk, will be driven by means of two endless belts whose upper ends travel on supporting elements and are in contact with the balls of the carrier plane surface, as well as with the balls of the central disk when the latter is in its lower position. With such a device, it is also possible to control both the linear motion of the endless belt and the rotation of the central disk when the latter is in its lower position in order to obtain an angular or orthogonal orientation of the batch being carried.

A man skilled in the art is also aware of devices in which the batches of flat workpieces are shifted sidewise to the left-hand side or the right-hand side as well as being angularly oriented. In those devices, the sidewise shift is ensured by a rectangular ball plate moving crosswise to the travelling direction of the ball driving appliances, which are arranged directly underneath the plate.

The angular orientation of the batches of the flat workpiece is obtained by means of the ball driving appliance consisting of four sections motorized individually. This arrangement allows changing the speed and the drive direction of every motorized section and, thereby, allows also an orthogonal and angular orientation of the batches of the flat workpiece.

The main drawback of this kind of device remains in the fact that the orientation of the batch carried is not exactly ensured and implies an important investment in electronic control components which, hence, increases the cost of the device. Moreover, in the first device described hereinbefore, if the operation of the orientating of the batch is to be effected when the central disk is in the lower position, it will be difficult or even impossible to orient a batch whose dimensions are larger than the diameter of the central disk.

As a rule in practical use, the two above-mentioned devices are combined in order to reduce the cost and complexity of the electronic control components. However, this combination enhances the encumbrance of this section of the production line and results in a considerable loss of space in a board or blank processing factory.

SUMMARY OF THE INVENTION

The object of the present invention is to provide a device designed to handle and to orient flat workpieces arranged in batches, which device will eliminate the above-mentioned drawbacks.

To accomplish this aim, the invention is directed to an improvement in a device for handling and orienting flat workpieces arranged in batches and, specifically, to flat workpieces consisting of box blanks and corrugated box blanks. The device includes a carrier plane surface located between lateral walls of a structure and the carrier plane is actuated by control means arranged therebeneath. The improvements are that the carrier plane surface consists of a series of driven rollers spaced apart from one another and between which a table, which is equipped with driving balls is located, and this table is movable upward and downward, as well as shifted sidewise in one or the other directions relative to the plane of the rollers. By the fact that the control means consist, on the one hand, of a circular element destined to actuate the driven balls, the upper surface of the circular element is in a permanent contact with the driven balls, as well as, on the other hand, the elements driving the rollers and by the fact that the movement of each of these control means is controlled according to the sidewise shift and/or orientation to be given to a batch of the flat workpieces resting on the carrier plane surface.

According to a first way of realizing the device concerned by the invention, the rollers of the carrier plane surface are driven by a flat belt onto which these rollers rest owing to their own weight, and this flat belt is arranged along one of the lateral walls of the device and supported by belt guides arranged in a vertical axis of each of the rollers. The table equipped with the driven balls consists of a frame provided on its side extending parallel to the driven balls with guiding rollers engaged in sliding rails fixed against the sides of a cradle facing the sides of the frame. The cradle also supports a circular element designed to actuate the driven balls themselves, which are arranged on crossbars making up the upper side of the table.

According to a variation of this construction, the device concerned by the invention comprises an assembly consisting of the sides of the cradle and the frame, and the assembly is connected to hoist or second means which allow it to be moved upward and downward, as well as to translation or third means for enabling the sidewise shift in one or the other direction of the table equipped with the driven balls. Preferably, the hoist means consist of four pneumatic jacks arranged in the four corners of the assembly comprising the sides of the cradle and the frame. The pneumatic jacks apply their effect between the lower crossbars of the structure of the device.

According to another way of construction, the circular element destined to actuate the driven balls consists of a disk whose upper surface is permanently in contact with the balls is a plane surface and can be covered with a layer of fabric contributing to the driving of the balls, which fabric forms means to improve the frictional contact between the balls and the disk.

Other advantages and features of the invention will be readily apparent from the following description of the preferred embodiments, the drawings and claims.

DESCRIPTION OF THE PREFERRED EMBODIMENTS

Figure 1:
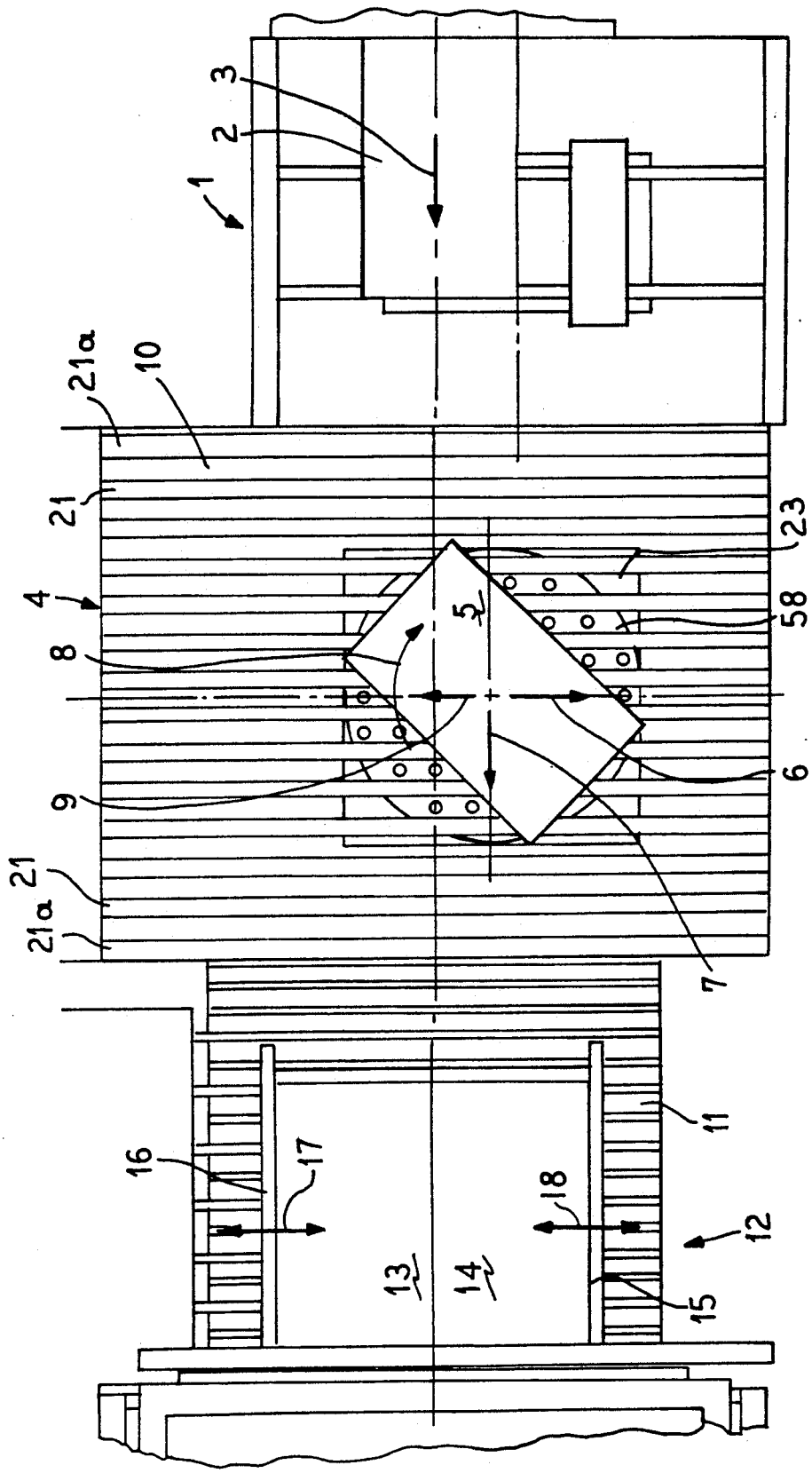
FIG. 1 is a partial top plan view of a production line utilizing the device according to the present invention.

The principles of the present invention are particularly useful when incorporated in a handling and orienting device, generally indicated at 4, which is illustrated as being disposed in a production line in FIG. 1. The production line includes an inlet transfer appliance or apparatus 1 on which a batch of flat workpieces 2 travels according to the direction shown by arrow 3. This inlet transfer appliance is followed by the handling and orienting device 4, which will shift orthogonally and angularly the batch of flat workpieces in a position 5 according to any or all of the directions shown by arrows 6, 7, 8 and 9. When the device 4 has processed the batch travelling on its carrier plane surface 10, it will forward them toward the inlet conveyor 11 of a palletizer, generally indicated at 12, according to the direction shown by the arrow 7. On the inlet conveyor 11, the batches of flat workpieces will occupy either the positions 13 or 14 and be pushed toward one another by means of two straightening pusher blades or shutters 15 and 16, which move alternately according to the direction shown by the double-arrows 17 and 18.

Figure 2:
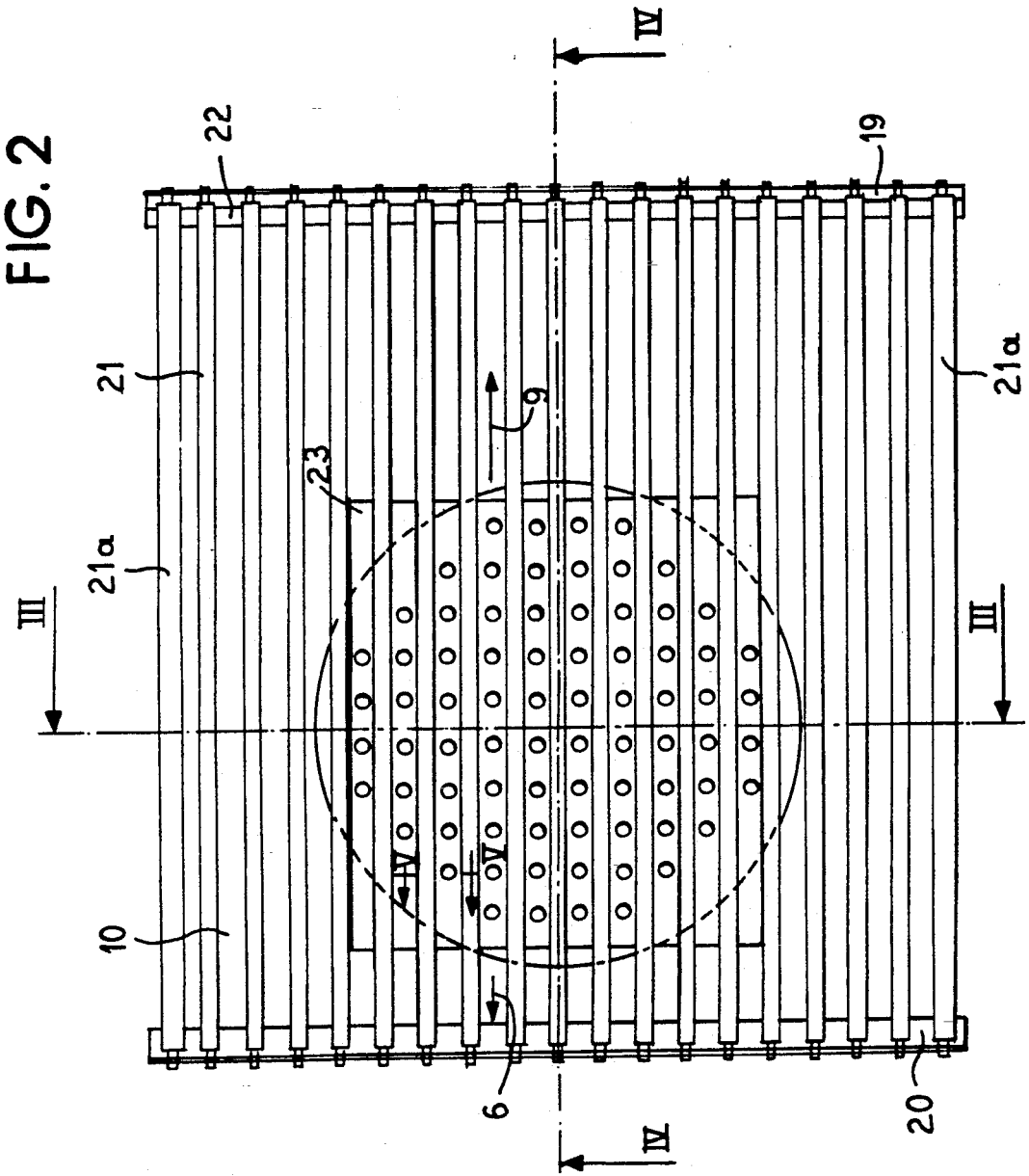
FIG. 2 is a top plan view of the handling and orienting device in accordance with the present invention.

As illustrated in FIG. 2, the handling and orienting device 4 comprises a carrier plane surface 10 consisting of a series of driven rollers 21 and 21a. The carrier plane surface 10 is supported by the two lateral walls 19 and 20 of the structure of the device and the two walls are linked by means of struts (not illustrated in this Figure). A flat belt 22, which is positioned along the lateral wall 19, is used to rotate the rollers 21 and 21a. A table 23 equipped with driven balls is inserted in the carrier plane surface 10 in such a way as to have its balls occupy a free space kept between adjacent rollers 21. This table 23 is equipped with the driven balls and is shiftable parallel to the axis of the rollers 21 according to the direction shown by the arrows 6 and 9.

Figure 3:
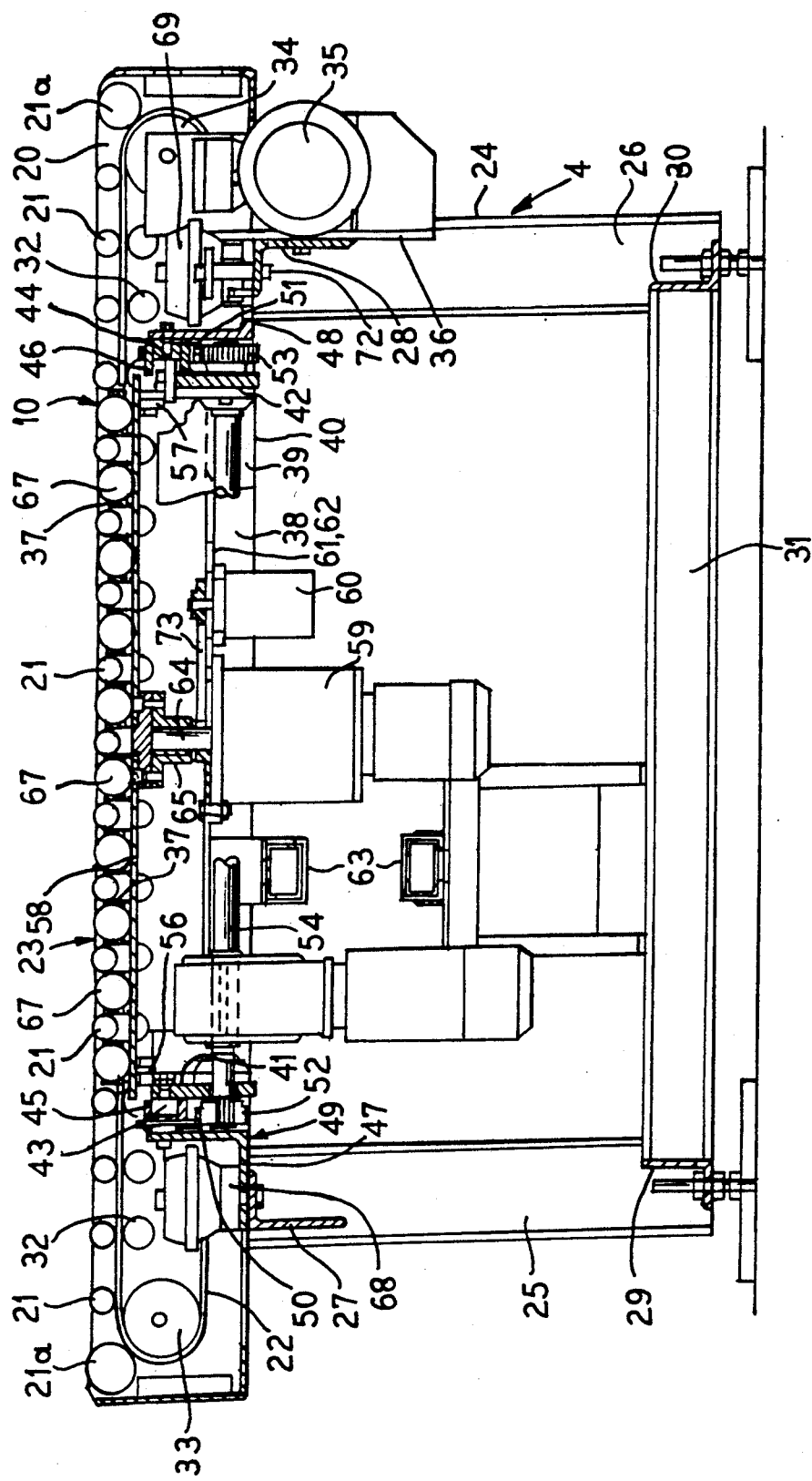
FIG. 3 is a partial transverse cross sectional view taken along the lines III—III of FIG. 2.
Figure 4:
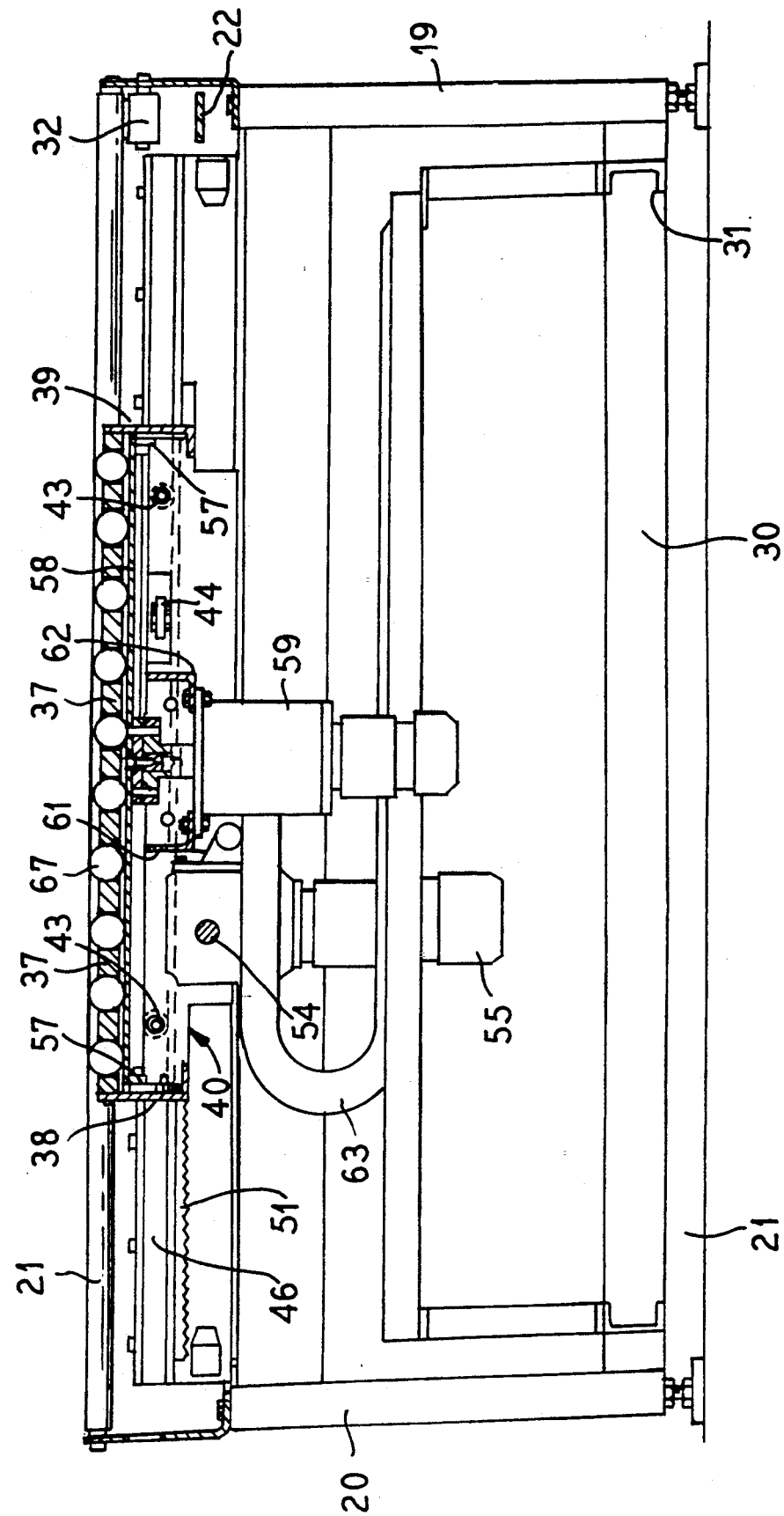
FIG. 4 is a partial longitudinal cross sectional view taken along the lines IV—IV of FIG. 2.

The structure of the device 4 is best illustrated in FIGS. 3 and 4. The carrier plane surface 10 is supported by a structure 24, which is formed of a welded construction holding the two lateral walls 19 and 20. The structure 24 includes vertical joists or posts 25 and 26, which are linked at their upper part by means of angle iron struts 27 and 28, as well as at their lower part by means of other struts 29 and 30. The lower struts 29 and 30 are attached to a beam 31. In this realization, the driven rollers 21 and 21a are arranged so as to be able to roll freely within grooves, which are machined in the upper parts of the lateral walls 19 and 20. The rollers 21 and 21a are rotatably actuated by means of the flat belt 22, which is supported in a vertical axis of the rollers 21 by belt guides 32, which are small rollers, and pulleys 33 and 34. The pulley 34 is a driven pulley controlled by a motor speed control 35, which is mounted on the base plate 36 that is screwed on an upper strut 28. The pulley 33 is, thus, free to rotate.

The table 23, which is equipped with the driven balls, consists of a series of crossbars 37 (ten bars in the present illustrated embodiment) and these crossbars extend parallel between the driven rollers 21. The crossbars 37 are linked together by two end members 38 and 39 of a frame 40 and make up the other side of the table 23, which is equipped with the driven balls. Bores 66 (best illustrated in FIGS. 5 and 6) are machined in the crossbars 37 in order to serve as seats for the balls 67. The bores 66 are machined in the bars in such a way that all the balls will be spread over the surface defined by the circumference of a central disk 58 onto which the balls rest permanently, owing to their own weight, as illustrated in FIG. 4.

The jaws or end members 38 and 39 are also linked between them by means of joists 41 and 42 in order to make up the frame 40. The frame 40 is provided with guiding rollers 43 and 44, which are engaged in sliding rails, such as 45 and 46, which are secured by threaded members on crossbars 47 and 48, which form a cradle 49. The lower part of each of the sliding rails 45 and 46 is provided with a rack 50 and 51, respectively, onto which pinions 52 and 53 are engaged. The pinions 52 and 53 are keyed on each end of a control shaft 54, which is driven by means of a motor speed control 55, which is attached to the frame 40. Moreover, the frame 40 is provided with supporting rollers 56 and 57, which are designed to maintain the position of the swivelling or rotating disk 58, which is driven from its center by means of a motor 59 controlled in rotation by an impulse generator 60. The motor 59 and the impulse generator 60 are arranged on corner pieces 61, 62 welded between the joists 41 and 42 of the frame 40. The impulse generator 60 is driven by the motor 59 by means of an assembly of pulleys and a toothed belt 73. The electric supply of the motor speed control 55, for the motor 59 and for the impulse generator 60 is ensured by a flexible wire 63. The swivelling or rotating disk 58 is fitted on the axle 64 of the motor 59 by means of a cottered sleeve 65, which is screwed and centered on the disk 58.

The cradle 49 is provided with four pneumatic jacks, such as 68 and 69, which are located in each of the four corners of the cradle. The pneumatic jacks 68 and 69 are anchored to an upper wing of a strut 27 and 28 and their pistons are attached to a lower side of the crossbars 47 and 48 of the cradle in order to have the cradle rise when the pneumatic jacks are actuated so that the plane defined by the top of the balls 67 will reach a position located slightly above the contact plane defined by the driven rollers 21 and 21a (see FIG. 6). The stroke of the cradle 49 is limited by a stop piece 72 arranged in the neighborhood of each pneumatic jack, such as illustrated by the jack 69.

In order to ensure the vertical movement of the table 23 equipped with drive balls, it could be envisioned to act by means of a unique jack on the motor 59 fitted on a sliding support which would allow the vertical movement of the table 23 equipped with the drive balls with regard to the structure 24 supporting the driven rollers 21 and 21a.

In another possible version, it would also be possible to vertically move the driven rollers 21, 21a instead of the table 23 equipped with the driven balls 67. In this variant, the table 23 equipped with the driven balls would be fixed permanently to the structure 24, whereas the driven rollers 21 and 21a would be arranged within a frame supported by the pneumatic jacks.

Figure 5:
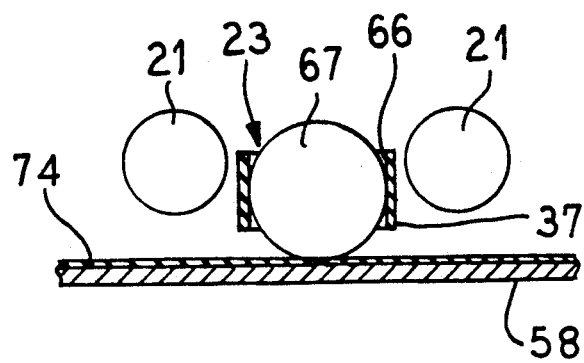
FIG. 5 is a partial view taken along the lines V—V of FIG. 2, with the transfer balls in a first lower position relative to the carrier plane.
Figure 6:
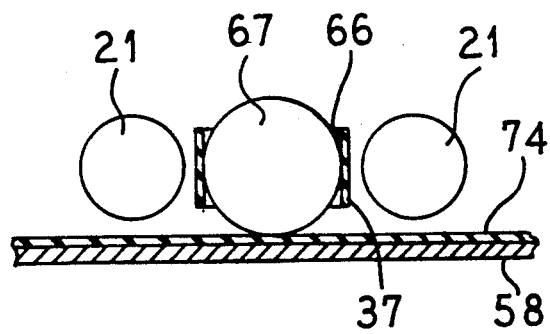
FIG. 6 is a similar cross sectional view of FIG. 5, with the transfer balls in a second and upper position relative to the carrier plane.

In FIG. 5, the ball 67 is in a lower relative position relative to the upper surface of the rollers 21, which is achieved when the table 23 is in its lower position. In FIG. 6, the ball 67 is in its upper position above the plane of the contact surfaces of the rollers 21. This is achieved when the table, illustrated by the disk 58, is in its upper position.

The disk 58, as illustrated in FIGS. 5 and 6, is preferably made of aluminum alloy and can advantageously be covered with a layer 74 of fabric, which will form frictional means to contribute to the rotating of the balls 67. The layer can be of a polymer. The friction means could also be formed by machining on the upper surface of the disk 58* and on the track of the balls 67, a series of concentric grooves with a section corresponding to the diameter of the ball 67.

The device operates in the following manner. A batch 2 of flat workpieces is moved by the inlet carrier 1 in the direction shown by arrow 3 of FIG. 1 toward the carrier plane surface 10 of the handling and orienting device 4. The driven rollers 21 and 21a of the device 4 are actuated until the batch 2 reaches the position 5 on the table 23 equipped with the carrier balls. When the batch is in position 5, on the table 23 is determined, for instance, by a photoelectric cell (not illustrated). At that moment, the batch is in the desired position on the table 23, the driving of the rollers 20 and 21a is stopped. In a first stage, the pneumatic jacks 68, 69 are actuated and the table 23 is shifted from its lower position to the upper position to, thus, support the batch. To shift the batch sidewise either in the direction of arrow 6 of FIG. 1, the drive motor arrangement of 55 is actuated to cause a shifting of the cradle in the main frame. When the cradle has been shifted the desired amount for the batch to be located in the desired position, which can be determined by means of photoelectric cells or position adapter, the pneumatic jacks 68 and 69 are released so that the rollers 21, 21a are again in position to support the batch as the cradle carrying the batch moves to the lower position. Then the rollers will rotate to move the batch in the direction of arrow 7 into a position of either 13 or 14 on the inlet carrier conveyor 11 of the palletizer 12. In the course of such an operation, the batch of flat workpieces will not be rotated. The batch will only have undergone a translation which leaves it either on the left-hand side or the right-hand side of the inlet conveyor 11 of the palletizer 12.

However, it might happen that the batch requires a rotation operation of 90° or 180°, as well as a translation to the right or to the left. To this aim, the batch of the flat workpieces having been carried forward toward the table 23 and the latter table being raised, the disk 58 will be rotated by the required amount to reach the desired orientation, in this case 180°, by controlling the motor 59 by means of the impulse generator 60. The rotation operation of the disk 58 can be effected in one or the other direction, as shown by the arrow 8. It only requires an appropriate monitor for the control of the motor 59. It is also possible to effect only the angular orientation of the batch of flat workpieces without sidewise shift in one or the other directions, i.e., for the batches having the large-dimensioned base or for other operatives, such as the arrangement of the batches on the conveyor 11 of the palletizer 12.

It is also possible to rotate one batch out of two in order to make up a staggered arrangement of batches on the conveyor 11. The staggered arrangement allows the consolidation of piles of batches which can be realized on the palletizer 12.

To summarize the operation of the above-described handling and orienting device 4 allows practically every piling combination of batches of flat workpieces by means of a single handling and orienting device.

Although various minor modifications may be suggested by those versed in the art, it should be understood that I wish to embody within the scope of the patent granted hereon all such modifications as reasonably and properly come within the scope of my contribution to the art.

I claim:

1. In a device to handle and orient flat workpieces arranged in batches, said device having a carrier plane surface located between lateral walls of a support structure, said carrier plane surface being actuated by control means arranged therebeneath, the improvement comprising the carrier plane surface consisting of a first assembly and a second assembly, the first assembly being a series of driven rollers spaced one from another, the second assembly being a table equipped with driven balls, which are arranged between the rollers of the first assembly, said table including a circular element having an upper surface for engaging the balls, first means for rotating the circular element to drive the balls, second means for producing a relative vertical shifting between the upper surfaces of the balls of the table and the rollers of the first assembly between a position with the plane of the upper surface of the balls being below a contact surface of the rollers to a second position with the balls being above the plane of the contact surface of the rollers, and third means for relative lateral shifting of the second assembly with the balls relative to the first assembly in a direction extending parallel to the rollers so that a batch of flat workpieces transported onto the device can be rotated and shifted laterally as desired.

2. In a device according to claim 1, wherein the second means for producing relative vertical shifting and the third means for relative lateral shifting moves the second assembly vertically and laterally within the first assembly, which is fixed within said support structure.

3. In a device according to claim 1, wherein the control means include means rotating the rollers of the carrier plane surface and consist of a flat belt on which said rollers rest, said flat belt being arranged along one lateral side of the first assembly and being supported by belt guides arranged in a vertical axis of each of said rollers.

4. In a device according to claim 1, wherein the circular element, which is actuated to rotate and drive the balls, consist of a disk having a side which is permanently in contact with the balls and which is a plane surface.

5. In a device according to claim 1, wherein the circular element consists of a disk having an upper surface permanently in contact with the balls, the upper surface of the disk is provided with means to improve the frictional contact between the balls and surface.

6. In a device according to claim 5, wherein the means for improving frictional contact includes a layer of material disposed on said disk.

7. In a device according to claim 1, wherein the second assembly includes a cradle having a pair of crossbars with sliding rails extending parallel to the driven rollers, said cradle supporting the circular element, said table equipped with the driven balls including a frame having side members extending parallel to the rollers and the sliding rails of the cradle, said side members having guide rolers which engage in the sliding rails.

8. In a device according to claim 7, wherein the cradle is connected to the second means and wherein the third means is connected between the cradle and the table.

9. In a device according to claim 8, wherein the crossbars of the cradle define four corners of the cradle, said second means consisting of pneumatic jacks attached to the crossbars at the four corners of the cradle and to struts of the support structure to shift the cradle and table relative to the support structure.

* * * * *